US010227965B2

(12) United States Patent
Mayhugh

(10) Patent No.: US 10,227,965 B2
(45) Date of Patent: Mar. 12, 2019

(54) WINDSHIELD REMOVAL ASSIST DEVICE

(71) Applicant: Kent R. Mayhugh, Slinger, WI (US)

(72) Inventor: Kent R. Mayhugh, Slinger, WI (US)

( * ) Notice: Subject to any disclaimer, the term of this patent is extended or adjusted under 35 U.S.C. 154(b) by 380 days.

(21) Appl. No.: 14/665,641

(22) Filed: Mar. 23, 2015

(65) Prior Publication Data

US 2016/0281700 A1    Sep. 29, 2016

(51) Int. Cl.
| | |
|---|---|
| *F04B 37/14* | (2006.01) |
| *F04B 39/10* | (2006.01) |
| *F04B 35/01* | (2006.01) |
| *B25B 11/00* | (2006.01) |
| *B26D 1/547* | (2006.01) |
| *B26B 27/00* | (2006.01) |
| *B60J 1/00* | (2006.01) |
| *B60J 1/02* | (2006.01) |
| *B62D 67/00* | (2006.01) |

(52) U.S. Cl.
CPC ............ *F04B 37/14* (2013.01); *B25B 11/007* (2013.01); *B26B 27/002* (2013.01); *B26D 1/547* (2013.01); *B60J 1/005* (2013.01); *B60J 1/02* (2013.01); *B62D 67/00* (2013.01); *F04B 35/01* (2013.01); *F04B 39/10* (2013.01); *Y10T 83/9292* (2015.04)

(58) Field of Classification Search
CPC ..... B25B 11/007; B26B 27/002; B26D 1/547; B26D 65/06; B60J 1/005; B60J 1/02; Y10T 83/04; Y10T 29/53974; Y10T 29/49998; B62D 65/06; B62D 67/00; F04B 37/14; F04B 39/10; F04B 35/01
USPC ....... 29/281.5, 402.03, 402.02, 156/108, 98; 83/13; 269/21
See application file for complete search history.

(56) References Cited

U.S. PATENT DOCUMENTS

| | | | | | |
|---|---|---|---|---|---|
| 6,139,300 | A | * | 10/2000 | Thomas ............... | B29C 73/025 264/36.21 |
| 6,164,043 | A | * | 12/2000 | Miller .................. | B43M 3/045 53/381.6 |
| 6,591,502 | B1 | * | 7/2003 | Gmeilbauer .......... | B26B 27/002 30/116 |
| 8,474,355 | B2 | * | 7/2013 | Finck ................... | B26B 27/002 29/402.03 |

(Continued)

FOREIGN PATENT DOCUMENTS

WO    WO_2012072899    * 6/2012

OTHER PUBLICATIONS

The Equalizer® Viper™ Windshield Removal with Jason Horne Published on May 5, 2014 at https://www.youtube.com/watch?v=rYpzD-VBq0l.*

(Continued)

*Primary Examiner* — Christopher M Koehler
*Assistant Examiner* — Mahdi H Nejad
(74) *Attorney, Agent, or Firm* — James Earl Lowe, Jr.

(57) ABSTRACT

A pane removal tool is disclosed for cutting through an adhesive bead with a wire. The tool comprises a suction cup, and a vacuum pump in air communication with the inside of the suction cup, and connected to the suction cup. The tool also includes a housing with a cam rotatably mounted therein for periodically operating the vacuum pump, the housing being mounted on the vacuum pump. The tool also includes a spool coaxial with and rotatable connected to the cam, and a stem connected to one of the cam and the spool, the stem being adapted to be engaged by a device to rotate the stem and the cam.

1 Claim, 5 Drawing Sheets

(56) References Cited

U.S. PATENT DOCUMENTS

| | | | |
|---|---|---|---|
| 9,095,988 B2* | 8/2015 | Finck | B26D 1/547 |
| 9,701,509 B2* | 7/2017 | Davies | B25B 11/007 |
| 9,862,563 B2* | 1/2018 | Finck | B65H 49/20 |
| 2002/0121330 A1* | 9/2002 | Eriksson | B26B 27/002 |
| | | | 156/108 |
| 2006/0117573 A1* | 6/2006 | Jensen | B26B 27/002 |
| | | | 30/286 |
| 2007/0000361 A1* | 1/2007 | Ericson | B25B 11/007 |
| | | | 83/13 |
| 2008/0012349 A1* | 1/2008 | Finck | B26B 27/002 |
| | | | 292/70 |
| 2008/0017295 A1* | 1/2008 | Finck | B26B 7/00 |
| | | | 156/108 |
| 2010/0132201 A1* | 6/2010 | Klabunde | B26B 7/00 |
| | | | 30/277.4 |
| 2010/0132882 A1* | 6/2010 | Hess | B26B 27/002 |
| | | | 156/250 |
| 2012/0193500 A1* | 8/2012 | Kniss | B25B 11/007 |
| | | | 248/363 |
| 2012/0222527 A1* | 9/2012 | Seebauer | B26D 1/547 |
| | | | 83/13 |
| 2012/0227896 A1* | 9/2012 | Clabunde | B26B 27/002 |
| | | | 156/193 |
| 2013/0037648 A1* | 2/2013 | Finck | B26D 1/547 |
| | | | 242/421 |
| 2013/0327193 A1* | 12/2013 | Davies | B25B 11/007 |
| | | | 83/13 |
| 2015/0314981 A1* | 11/2015 | Finck | B26D 1/547 |
| | | | 242/159 |
| 2016/0090977 A1* | 3/2016 | Liao | F04B 37/14 |
| | | | 254/133 R |
| 2016/0193743 A1* | 7/2016 | Carlton | B62D 65/00 |
| | | | 83/13 |
| 2016/0207182 A1* | 7/2016 | Sprik | F16B 33/004 |
| 2017/0100849 A1* | 4/2017 | Finck | B26D 5/08 |

OTHER PUBLICATIONS

Evotec Cut It EVO 1 (Published on Jul. 28, 2014, available at https://www.youtube.com/watch?v=NxNs1aQjzUc).*

* cited by examiner

WINDSHIELD REMOVAL ASSIST DEVICE

BACKGROUND

The present invention relates to a device for cutting through an adhesive bead of a pane.

The invention further relates to a method for cutting through an adhesive bead of a pane wherein a first end of a wire is fastened on a winding-up device, a second end of the wire is passed through the adhesive bead and is placed around the adhesive bead from the outside and is fixed, and the winding-up device is driven to wind up the wire to cut through the adhesive bead.

The device and the method are suited for cutting out panes installed, for example, in motor vehicles, buildings, railway trains, cableway cabins, aircraft and ships. Although the present application will predominantly refer to applications in connection with vehicles, those applications are described by way of example only and are not meant to restrict the application.

Windshields of modern vehicles are firmly connected with a circumferential body flange by an adhesive bead consisting of a polyurethane adhesive or another suitable adhesive. The adhesive bead consists of a material so strong that the adhesive, together with the windshield, increase the mechanical stability of the vehicle. It is understood that due to the high strength and toughness of the adhesive cutting through the adhesive is a relatively difficult task. However, as windshields have to be exchanged relatively frequently, due to rock-fall or other damage, there must be available for every vehicle type a suitable device and a suitable method by which the windshield can be removed.

SUMMARY

Disclosed is a pane removal tool for cutting through an adhesive bead with a wire. The tool comprises a suction cup, and a vacuum pump in air communication with the inside of the suction cup, and connected to the suction cup. The tool also includes a housing with a cam rotatably mounted therein for periodically operating the vacuum pump, the housing being mounted on the vacuum pump. The tool also includes a spool coaxial with and rotatable connected to the cam, and a stern connected to the cam, the stem being adapted to be engaged by a device to rotate the stem and the cam.

Figure 1:
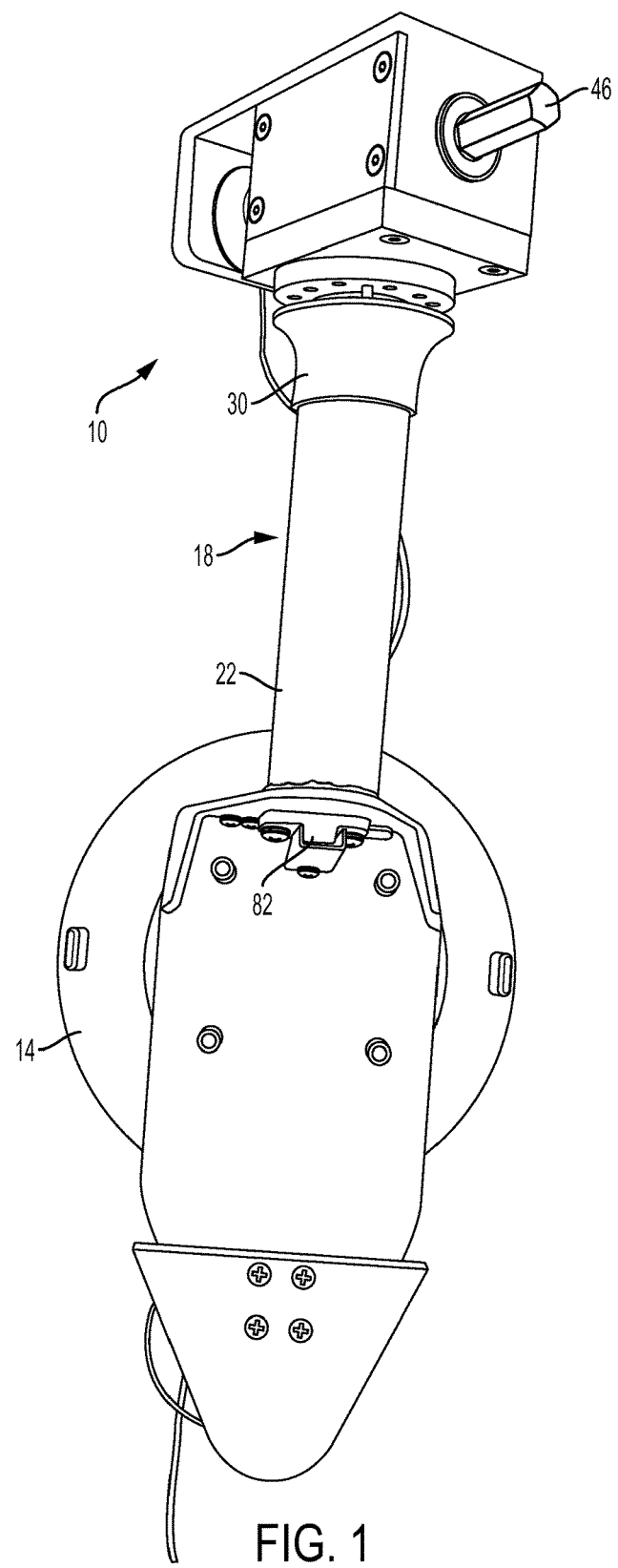
FIG. 1 is a perspective top view of a windshield removal assist tool according to this disclosure.
Figure 2:
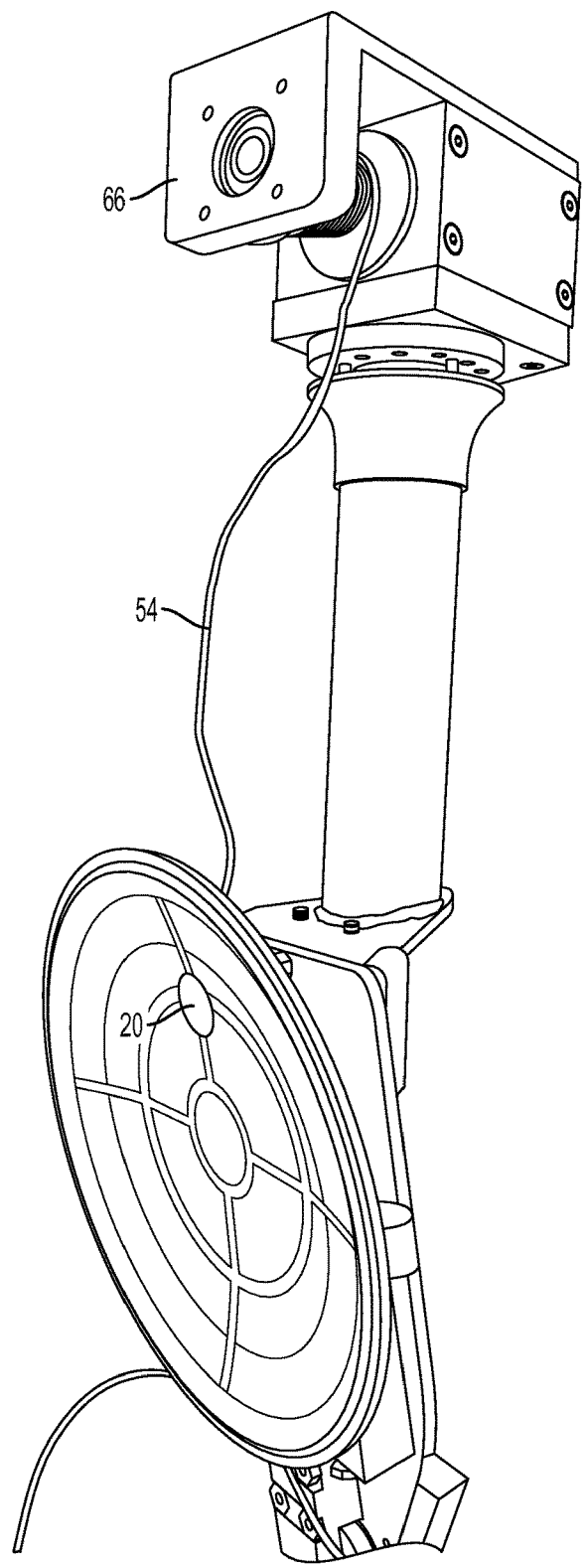
FIG. 2 is a perspective bottom view of the tool of FIG. 1.
Figure 3:
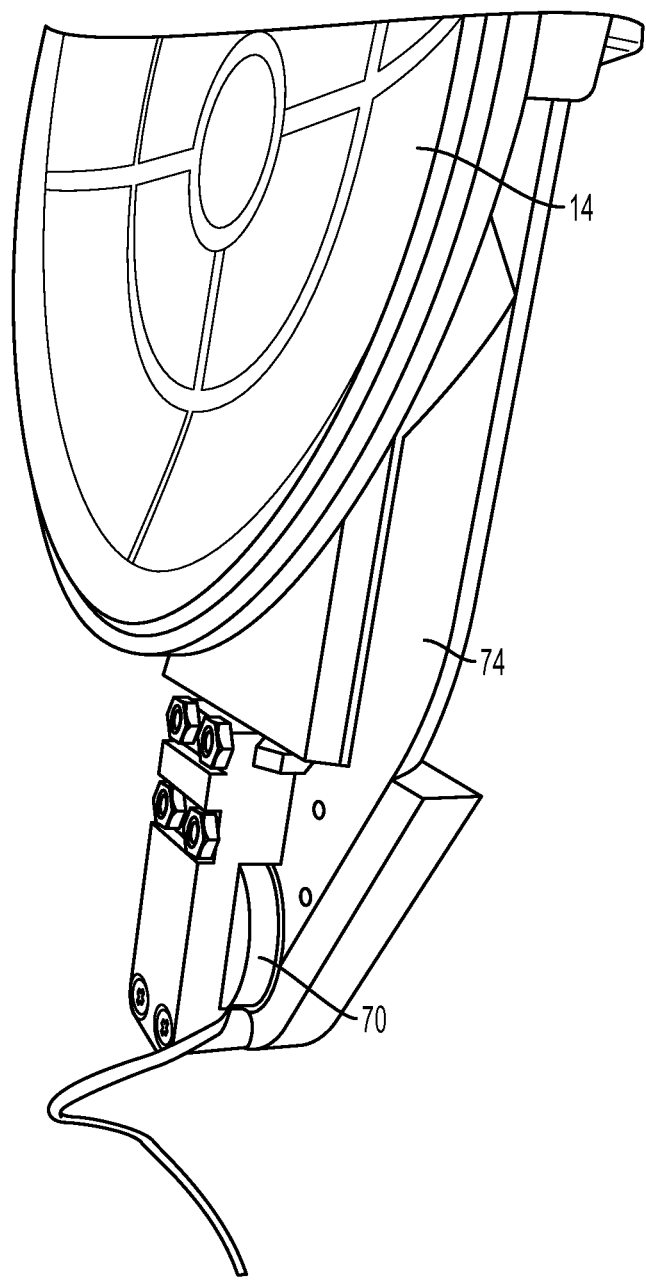
FIG. 3 is a perspective end view of a guide portion of the tool of FIG. 1.

Before one embodiment of the disclosure is explained in detail, it is to be understood that the disclosure is not limited in its application to the details of the construction and the arrangements of components set forth in the following description or illustrated in the drawings. The disclosure is capable of other embodiments and of being practiced or being carried out in various ways. Also, it is to be understood that the phraseology and terminology used herein is for the purpose of description and should not be regarded as limiting. Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof. Further, it is to be understood that such terms as "forward", "rearward", "left", "right", "upward", "downward", "side", "top" and "bottom", etc., are words of convenience and are not to be construed as limiting terms.

DESCRIPTION OF THE EMBODIMENT

In the context of the present application the term "wire" is to be understood to mean every type of wire or cord suited for cutting through an adhesive bead of a vehicle pane. This means that a wire must have sufficient tear strength and flexibility, and may under certain circumstances be provided with a suitable coating or suitable surface features in the form of a toothing or the like to support the cutting operation. However, it is understood that the term "wire" also includes a suitable cord made from a plastic material or any other material.

As illustrated in FIGS. 1-5, disclosed is a winding-up device or pane removal tool 10. The tool 10 comprises a suction cup 14, and a reciprocating plunger operated vacuum pump 18 in air communication with the inside of the suction cup 14 via an opening 20. The vacuum pump 18 is connected at one end 22 to the suction cup 14. A vacuum pump plunger 26 extends from an opposite end 30 of the vacuum pump 18.

Figure 5:
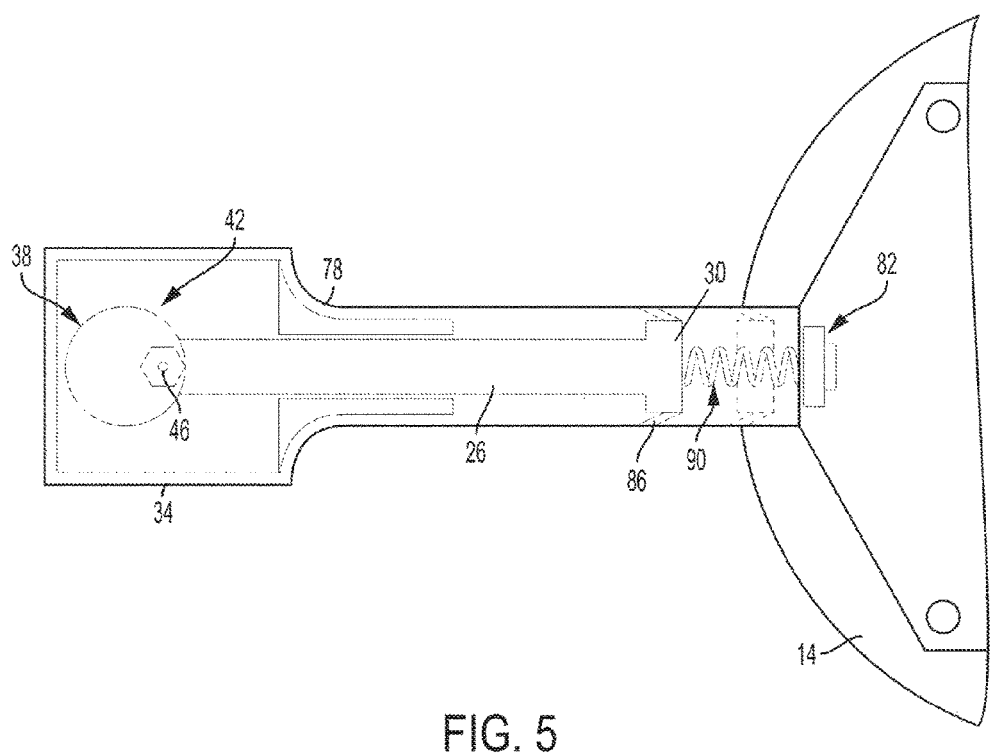
FIG. 5 is a schematic cross sectional view of a portion of the tool of FIG. 1.

The tool 10 further includes operating means for periodically operating the vacuum pump 18. More particularly, as shown in FIG. 5, the operating means comprises a housing 34 mounted on the opposite end 30 of the vacuum pump 18. A cam 38 is mounted for rotation within the housing 34, and the cam 38 is adjacent an end 42 of the plunger 26 so that as the cam 38 rotates, it periodically presses against the plunger end 42, producing a reciprocating action on the plunger 42.

The tool 10 also includes a stem 46 (see FIG. 1) connected to the cam 38 and extending from the cam 38 external of the housing 34. The stem 46 is adapted to be engaged by a device, such as a drill (not shown), to rotate the stem 46 and the cam 38. The tool 10 also includes a spool 50 coaxial with and rotatable connected to the stem 46 for rotation with the cam 38 about the stem axis. A wire 54 used to cut the glaze is wound around the spool 50.

Figure 4:
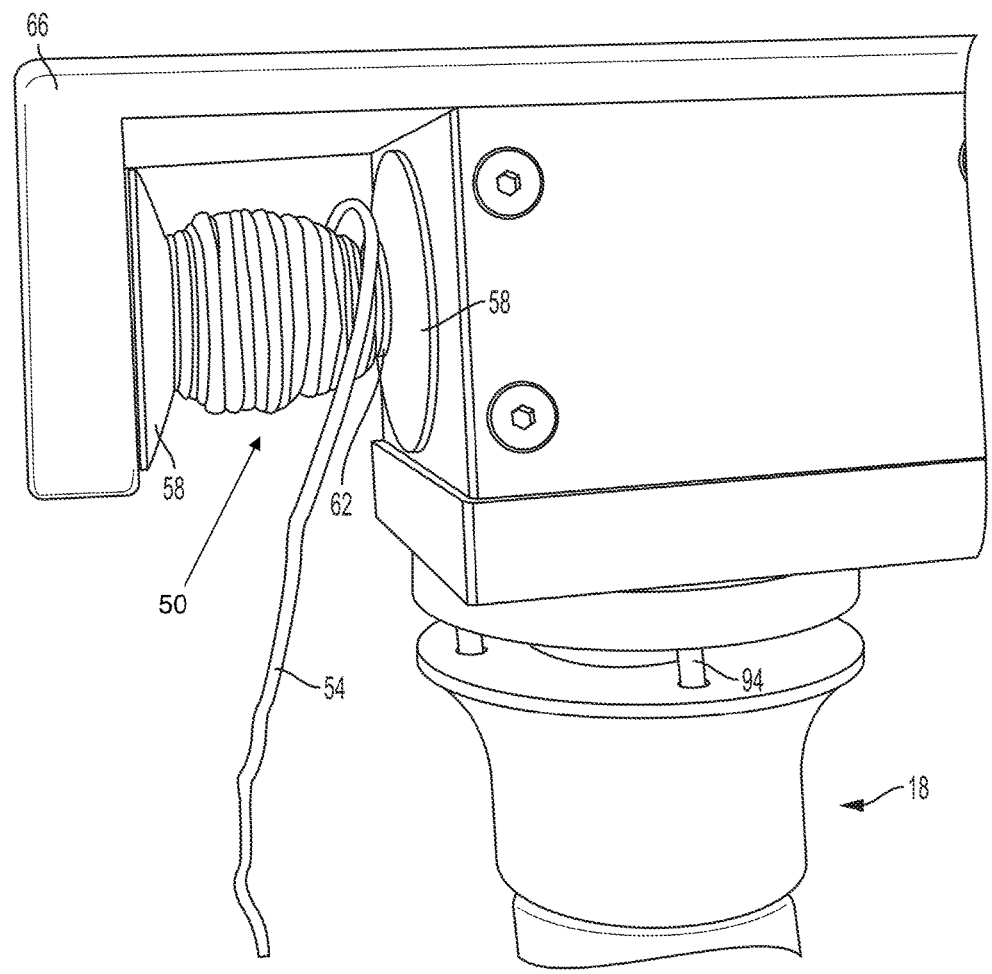
FIG. 4 is a perspective side view of spool portion of the tool of FIG. 1.

More particularly, as shown in FIG. 4, the spool 50 includes end plates 58, and the tool 10 further includes a washer 62 coaxially mounted on the spool 50 between the end plates 58. The wire 54 to be wound on the spool 50 can have an end placed between the washer 62 and an end plate 58, so, as the washer 62 holds the wire 54 in place, the wire 54 can be wound on the spool 50. A bracket 66 (see FIG. 2) connected to the housing 34 mounts the spool 50 on the housing 34.

The tool 10 also includes a guide or pulley 70 (see FIG. 3) mounted on the suction cup 14 opposite the vacuum pump 18. More particularly, the pulley 70 is mounted on an extension 74 from the one end 22 of the vacuum pump 18.

As illustrated in FIG. 5, the vacuum pump 18 includes a tube 78, and the plunger 26 is received within the tube 78. An air valve 82 is in air communication with and between the suction cup 14 and the plunger 26, the air valve 82 permitting air to pass only towards the plunger 26. A cup seal 86 is between the plunger 26 and the tube 78, and the cup seal 86 permits air to pass only toward the opposite end 30 of the vacuum pump 18. A compression spring 90 is located between the one end 22 of the vacuum pump 18 and the opposite end 30 of the plunger 26. In operation, the movement of the plunger 26 and cup seal 86 from an initial position, towards the air valve 82, results in the air between the cup seal 86 and the valve 82 passing over the cup seal 86. As long as air is still available in the suction cup 14, the plunger 26 then returns to its initial position, pulling air through the air valve 82 back into the area between the cup seal 86 and the air valve 82. But when there is no air available in the suction cup 14 to fill this space, the vacuum in the space prohibits the compression spring 90 from returning the plunger (shown in ghost in FIG. 5) to its initial position. As a result, the end 42 of the plunger 26 adjacent the cam 38 is spaced apart from the cam 38, until air is again present within the suction cup 14, allowing air to enter the space and the plunger 26 to return to its initial position, where it can be contacted by the cam 38. In other words, when the suction cup 14 is vacated of air, the plunger 26 stays within the vacuum pump 18 spaced apart from the cam 38.

In this embodiment, the housing 34 is rotatably mounted by ball bearings (not shown) for rotation relative to the opposite end 30 of the vacuum pump 18. The housing 34 is also mounted for sliding motion along an axle (not shown) towards and away from the opposite end 30 of the vacuum pump 18. The housing 34 is spring loaded (not shown) so that it is biased at all times toward the opposite end 30 of the vacuum pump 18.

The tool 10 also includes pins 94 (see FIG. 4) that engage in openings (not shown) in the opposite end 30 of the vacuum pump 18 to releasably fix the housing 34 relative to the opposite end of the vacuum pump. Thus, the housing 34 can be pulled by an operator away from the vacuum pump 18, and then rotated to a position most convenient for attaching the drill to the stem 46, to improve drill access to the stem, and drill positioning, to operate the tool 10. After reaching such a preferred position, the housing 34 then moves towards the vacuum pump end and the pins enter holes (not shown) that receive the pin ends. In this manner, the housing then again becomes fixed relative to the vacuum pump end.

The tool 10 is then used by the following method. Place the tool 10 on the inside of a pane (not shown) using the section cup 14, then use a drill placed on the stem 46 to power the vacuum pump 18. After air is removed from the suction cup 14, further operation of the drill results in the winding or unwinding, depending on the direction of rotation of the drill, of wire 54 onto or from the spool 50. Pull an amount of wire 54 needed to cut the pane (about 20 feet for a car windshield) out of the spool 50, around the pulley 70, and then guide an end of the wire 54 through the adhesive bead and fix it on another suction cup end attachment device (not shown) or some structure, like a windshield wiper support post, on the outside of the pane. Wire 54 is then wound back onto the spool 50 by operating the drill. The tool 10 is then moved after the suction cup 14 is released from the pane, and then secured again at a new position on the pane around the periphery of the pane as the bead cutting progresses.

This method provides an advantageous way of cutting though the adhesive bead securing a pane to a structure, such as an automobile.

Various other features of this disclosure are set forth in the following claims.

The invention claimed is:

1. A pane removal tool adapted to be mounted on a pane for cutting through an adhesive bead with a wire, the tool comprising:
   no more than one suction cup,
   a reciprocating plunger operated vacuum pump in air communication with an inside of the no more than one suction cup, the pump being connected to the no more than one suction cup,
   a spool spaced apart along the pane from the no more than one suction cup,
   a bracket connected to and between the spool and to the no more than one suction cup,
   a longitudinal extending stem drivingly connected to the spool and drivingly connected to the plunger operated vacuum pump via a cam mechanism rotatably mounted within a housing, the stem extending externally of the housing and having a plurality of longitudinally extending surfaces adapted to be engaged by a device to rotate the spool, and
   a wire guide mounted on the no more than one suction cup.

* * * * *